(12) United States Patent
Witzmann et al.

(10) Patent No.: US 12,716,527 B2
(45) Date of Patent: Aug. 25, 2026

(54) NOZZLE HEAD, CLEANING SYSTEM, METHOD FOR CLEANING AND GLASS ELEMENT

(71) Applicant: Schott AG, Mainz (DE)

(72) Inventors: André Witzmann, Waldershof (DE); Ulla Trinks, Mitterteich (DE); Reiner Artmann, Mitterteich (DE)

(73) Assignee: SCHOTT AG, Mainz (DE)

( * ) Notice: Subject to any disclaimer, the term of this patent is extended or adjusted under 35 U.S.C. 154(b) by 60 days.

(21) Appl. No.: 18/526,784

(22) Filed: Dec. 1, 2023

(65) Prior Publication Data

US 2024/0110646 A1 Apr. 4, 2024

Related U.S. Application Data

(62) Division of application No. 17/471,444, filed on Sep. 10, 2021, now abandoned.

(30) Foreign Application Priority Data

Sep. 11, 2020 (EP) .................................... 20195761

(51) Int. Cl.
*F16L 9/10* (2006.01)
*B05B 1/14* (2006.01)
(Continued)

(52) U.S. Cl.
CPC ................ *F16L 9/105* (2013.01); *B05B 1/14* (2013.01); *C03C 23/0075* (2013.01);
(Continued)

(58) Field of Classification Search
None
See application file for complete search history.

(56) References Cited

U.S. PATENT DOCUMENTS 2,193,999 A 3/1940 Allen
2,735,794 A 2/1956 Pletcher
(Continued)

FOREIGN PATENT DOCUMENTS

CN 206315938 U 7/2017
DE 30 07 265 A1 9/1981
(Continued)

OTHER PUBLICATIONS

Md Scratch Jedi: "Off Topic: Sand Art Tutorial", YouTube, Aug. 16, 2019, retrieved from the Internet URL: https://www.youtube.com/watch?v=pDCBbpcM3K4 May 5, 2021 (1 page).
(Continued)

*Primary Examiner* — Kaj K Olsen
*Assistant Examiner* — Pradhuman Parihar
(74) *Attorney, Agent, or Firm* — TAYLOR & EDELSTEIN, PC

(57) ABSTRACT

A cleaning system for cleaning the inside of a glass element with a fluid includes a nozzle head including a cleaning opening for releasing a part of the fluid and pointing in a first direction and a pressure balancing opening for releasing a part of the fluid and pointing in a second direction. Two half spaces including a first one and a second one are separated by a plane which is perpendicular to a center axis of the nozzle head. A first direction vector of the first direction points in a direction at least one of towards the first half space or away from the second half space. A second direction vector of the second direction points in a direction at least one of towards the second half space or away from the first half space.

20 Claims, 5 Drawing Sheets

(51) Int. Cl.

| | |
|---|---|
| ***B05B 13/06*** | (2006.01) |
| ***C03C 23/00*** | (2006.01) |

(52) U.S. Cl.

CPC ..... *B05B 13/0627* (2013.01); *B08B 2209/032* (2013.01); *B08B 2209/04* (2013.01)

(56) References Cited

U.S. PATENT DOCUMENTS

| | | | | |
|---|---|---|---|---|
| 3,744,723 | A * | 7/1973 | Davis | B05B 1/14 239/560 |
| 4,863,555 | A | 9/1989 | John, Jr. et al. | |
| 5,591,273 | A | 1/1997 | Tsukamoto et al. | |
| 5,819,770 | A | 10/1998 | Randall et al. | |
| 6,059,202 | A | 5/2000 | Zink et al. | |
| 9,776,222 | B2 | 10/2017 | Fiorentini | |
| 2011/0100401 | A1 | 5/2011 | Fiorentini | |
| 2015/0020659 | A1 | 1/2015 | Hoshiba et al. | |
| 2019/0151904 | A1 | 5/2019 | Bauer | |
| 2019/0210909 | A1 | 7/2019 | Wagner et al. | |
| 2019/0224725 | A1 * | 7/2019 | Gromes, Sr. | B08B 3/02 |
| 2019/0344918 | A1 | 11/2019 | Mangold et al. | |

FOREIGN PATENT DOCUMENTS

| | | | |
|---|---|---|---|
| DE | 102015106902 | A1 | 11/2016 |
| JP | 2005-87804 | A | 4/2005 |
| WO | 2014/002666 | A1 | 1/2014 |
| WO | 2016173739 | | 11/2016 |

OTHER PUBLICATIONS

Partial European Search Report dated Mar. 3, 2021 for European Patent Application No. 20195761.0 (16 pages).

European Search Report dated May 14, 2021 for European Patent Application No. 20195761.0 (7 pages).

European Communication Pursuant to Article 94(3) EPC dated Jun. 23, 2022 for European Patent Application No. 20 195 761.0 (14 pages).

Chawla, Mantosh K. Monitoring cleanliness and defining acceptable cleanliness levels. Surface Contamination and Cleaning, Feb. 2003, vol. 1, pp. 23-41. <DOI: 10.1201/9789047403289> (Year: 2003).

"Understanding Your ISO 16232 Report: Cleanliness Code or CCC," webpage <http://www.crownindservices.com/Precision-Cleaning/Cleanliness-Testing/Understanding-ISO-16232/Cleanliness-Code-or-CCC>, Sep. 18, 2017, retrieved from the Internet Archive Wayback Machine <https://web.archive.org/web/20170918094257/http://www.crownindservices.com/Precision-Cleaning/Cleanliness-Testing/Understanding-ISO-16232/Cleanliness-Code-or-CCC> on Jul. 27, 2023. (Year: 2017).

"Specification for Cleanliness of Components for Use in Oxygen, Oxidizer, Fuel, and Pneumatic Systems", MSFC Technical Standard [MSFC-SPEC-164 Rev. E]. NASA, effective Jul. 21, 2020. Retrieved from the Internet:<URL: https://standards.nasa.gov/sites/default/files/standards/MSFC/E/0/msfc-spec-164e.pdf> (Year: 2020).

* cited by examiner

NOZZLE HEAD, CLEANING SYSTEM, METHOD FOR CLEANING AND GLASS ELEMENT

CROSS REFERENCE TO RELATED APPLICATIONS

This is a division of U.S. patent application Ser. No. 17/471,444 entitled "NOZZLE HEAD, CLEANING SYSTEM, METHOD FOR CLEANING AND GLASS ELEMENT" filed on Sep. 10, 2021, which is incorporated herein by reference. U.S. patent application Ser. No. 17/471,444 claims priority to European Patent Application No. EP 20195761.0 filed on Sep. 11, 2020, which is incorporated in its entirety herein by reference.

BACKGROUND OF THE INVENTION

1. Field of the Invention

The present invention relates to a nozzle head and to a cleaning system comprising such a nozzle head. The present invention also relates to a method for cleaning a glass element, especially by a nozzle head or a cleaning system provided according to the invention. The invention further relates to a glass element and to a bundle.

2. Description of the Related Art

In the state of the art, glass elements such as glass tubes might be subject to contamination. Especially, particles might accumulate on the surface, especially the inner surface, of the glass element.

The particles might originate, for example, from the manufacturing process of the respective glass element. In case of glass tubes, one particularly severe source of particles is the process of confectioning the glass tubes from a glass tube strand. Here, the glass tubes might be lengthened from the glass tube strand by sawing or otherwise cutting. This comes along with the creation of a considerable amount of particles which predominantly accumulate in the region of the end sections of the glass tubes. After confectioning, the glass tubes, especially their end sections, are subsequently heated again in order to seal and shape the cutting edge.

However, this might lead to the situation that the loose particles in the end regions are connected with the surface of the glass tube in a firm manner. Of course, also particles originating from other sources such as dust, educts or dirt from the environment might then be attached to the glass element during heating likewise. Such particles often cannot be removed in a subsequent washing procedure so that they are still present in the final glass element.

Dependent on the purpose of the respective glass element, however, particles are highly undesired. For example, if the glass element is intended to be used as pharmaceutical container for holding pharmaceutical compositions, a glass element of high quality, i.e. having no or almost no particles, is of particularly importance. Especially particles attached on the inner surface of the glass element, such as the surface of a glass tube facing towards the lumen, are of high severity. If they get in contact with the pharmaceutical composition, the pharmaceutical composition might be contaminated either in that substances from the particles leak into the pharmaceutical composition or even that the particles as whole get off the surface of the glass element and into the composition.

In conventional manufacturing processes of, for example, glass tubes, thus, after lengthening and prior to heating, pressurized air is used to remove particles from the inner surface of the glass tubes. This is accomplished in that a nozzle head injects an air stream into the glass tube from one end, in order to blow particles to the other end and, hence, out of the glass tube. While this procedure is easy to implement from a technical point of view, it suffers from disadvantages.

In this respect, only a portion of the air is actually injected into the glass tube, while the remainder is blown past the glass tube and might raise dust and the like in the environment. This in turn might lead to a new source of contamination. Furthermore, particles are blown from one end section to the other end section via the middle section, respectively, of the glass tube. Hence, there is the risk that this middle section afterwards is more contaminated as it initially has been the case. This is especially true since typically there are more particles in the end sections than in the middle section. It has also been noted that the high pressure leads to high noise emissions. In addition, since a laminar air flow is built up within the glass tube, the flow velocity at the inner surface of the glass tube decreases over the distance. Thus, the farther the particles are located away from the end section, the less the interaction forces between the injected air flow and the particles are. Glass tubes exceeding a specific length, therefore, might not be cleaned along their entire length in a sufficient manner.

What is needed in the art is a way that allows a reduction of the contamination with particles in an easy and cost-efficient manner for glass elements.

SUMMARY OF THE INVENTION

In some exemplary embodiments provided according to the invention, at least one glass element includes: a first end; a second end; and a hollow portion including a first end section including the first end of the at least one glass element, a middle section, and a second end section including the second end of the at least one glass element. Each section has an inner surface and an outer surface and all sections are of equal length. A ratio of a number of particles on the inner surface at the first end section and/or the second end section to a number of particles on the inner surface at the middle section is 20 or less.

In some exemplary embodiments provided according to the invention, a cleaning system for cleaning the inside of a glass element with a fluid includes a nozzle head. The nozzle head includes: a cleaning opening for releasing a part of the fluid and pointing in a first direction; and a pressure balancing opening for releasing a part of the fluid and pointing in a second direction. Two half spaces including a first one and a second one are separated by a plane which is perpendicular to a center axis of the nozzle head. A first direction vector of the first direction points in a direction at least one of towards the first half space or away from the second half space. A second direction vector of the second direction points in a direction at least one of towards the second half space or away from the first half space.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
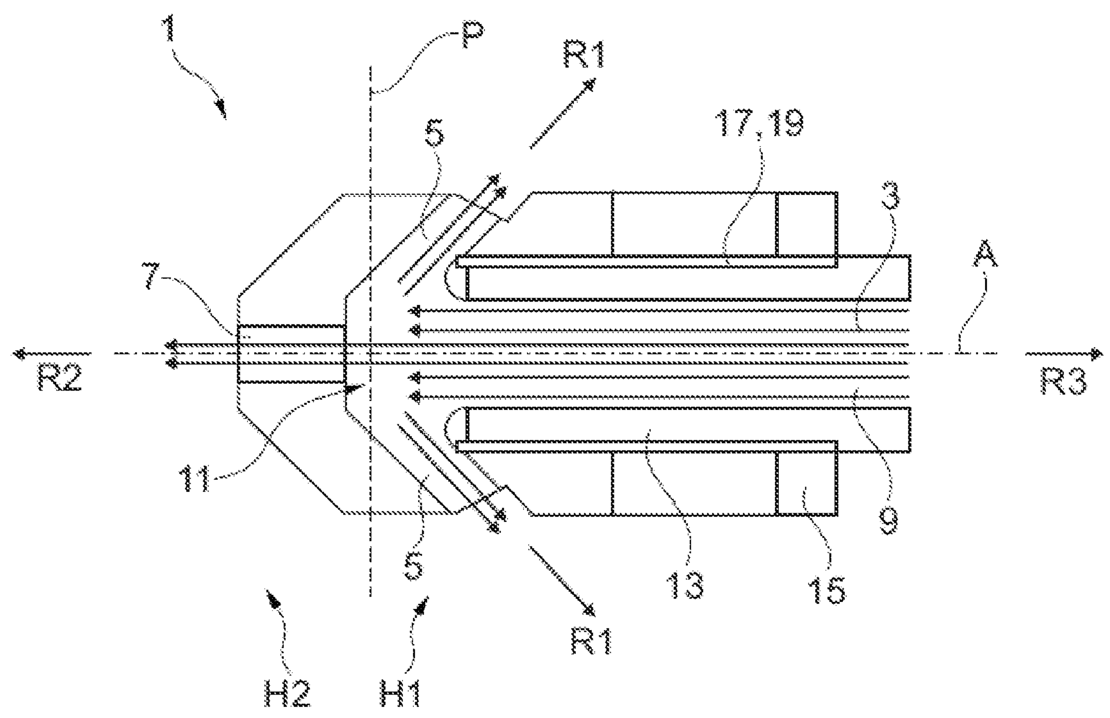
FIG. 1 illustrates a cross-sectional view of a nozzle head provided according to the invention in a first configuration.

Exemplary embodiments provided according to the invention include a nozzle head for cleaning the inside of a glass element with a fluid, the nozzle head including: at least one cleaning opening for releasing at least one part of the fluid and pointing in a first direction; and at least one pressure balancing opening for releasing at least one part of the fluid and pointing in a second direction; two half spaces, a first one and a second one, are separated by a plane which is perpendicular to the center axis of the nozzle head, and the first direction vector of the first direction points in a direction towards the first half space and/or away from the second half space; the second direction vector of the second direction points in a direction towards the second half space and/or away from the first half space.

Exemplary embodiments provided according to the invention are, thus, based on the surprising finding that particles can be efficiently removed from a glass element if the nozzle head can be inserted into the glass element and remove particles by blowing them back to the closer end rather than via the middle section to the distant end, respectively, of the glass element. This is achieved by exemplary embodiments provided according to the invention in that the cleaning openings are pointing in a first direction so that fluid is also released in or towards a first half space, i.e. in a direction backwards.

Furthermore, it has been realized that inserting the nozzle head into the glass element allows for an interaction between the fluid and the particles which is significantly increased. In addition, the particles are not blown across the middle section of the glass element. Hence, a more efficient cleaning process is possible.

By providing pressure equalization in that a pressure balancing opening is provided, it can reliably be ensured that during blowing the particles out of the glass element, other particles located past the nozzle head are not sucked into the fluid flow.

It is possible that the two halves of the glass element can be cleaned independently from the two ends. Due to pressure equalization, no particles are sucked from the other half. Likewise, in case a glass element is cleaned from both ends by two respective nozzle heads in parallel, the pressure balancing opening prevents the creation of a negative pressure within the glass element and the suction of particles.

Since the nozzle head can be inserted into the glass element, the fluid flow is effective only within the glass element. Furthermore, the entire fluid flow released by the nozzle head, be it by the cleaning opening or the pressure balancing opening, is directed outside the glass element. Thus, no particles from outside can get into the glass element. Due to the fluid flow directed backward, it is also prevented that the fluid emitted by the pressure balancing opening lead to suction of air from the outside of the glass element.

The provided approach, thus, allows cleaning glass elements such as glass tubes of nearly arbitrarily length. Furthermore, it is sufficient and appropriate to insert the nozzle head only until the center of the glass element or even less, for example in the area where cleaning is required. Hence, the arm which holds the nozzle head can be designed shorter in length. This prevents oscillation of the arm, hence the nozzle head. Thus, possible damages of the glass element due to collisions with the nozzle head are avoided.

It is acknowledged that according to the present invention, the term "opening," especially with respect to a cleaning opening or a balancing pressure opening, may be understood as a three dimensional space which might be obtained e.g. by drilling.

It is acknowledged that according to the present invention the direction in which a cleaning opening or a pressure opening points may be understood as a direction which points outside the volume enclosed by the outer shape of the nozzle head and which is normal to at least one cross section of the respective opening. Alternatively, the direction in which a cleaning opening or a pressure balancing opening points might also be understood as the direction into which the respective opening substantially releases the fluid.

The center axis of the nozzle head is, for example, the rotation axis of the nozzle head.

It has been found that when the nozzle head is used for cleaning glass elements, such as tubular elements, no negative pressure is created at the ends of the respective glass element, especially at the ends of the respective tubular element. If a nozzle inside the glass tube were to blow perpendicularly against the wall, overpressure would result with only one nozzle at both ends. Otherwise, if the cleaning nozzle were directed towards one end of the glass element, the air stream generated would carry air from the other side and a negative pressure would be created on the second side. Hence, particles from the environment would be sucked into the glass element. For the provided nozzle head, this entrainment of air is suppressed. A small opening, such as a slit, in the nozzle, directed towards the second end of the pipe, may be sufficient for this. Therefore, the provided nozzle head allows removing particles from inside the glass element, such as a tubular element, without causing further contaminations.

In some embodiments, it might be provided that the nozzle head further comprises at least one feeding opening for feeding the nozzle head with the fluid and pointing in a third direction. In some embodiments, (i) the third direction vector of the third direction points in a direction towards the first half space and/or away from the second half space, (ii) the third direction vector is anti-parallel to the second direction and/or (iii) the third direction vector is parallel to the center axis of the nozzle head.

A feeding opening allows easy and secure attachment of a fluid supply line to the nozzle head.

A respective orientation of the feeding opening allows obtaining a nozzle head which can be handled in a safe manner due to proper distribution of the different openings across the nozzle head.

It is acknowledged that according to the present invention, the term "opening" with respect to a feeding opening may be understood as a three dimensional space which might be obtained e.g. by drilling.

It is acknowledged that according to the present invention, the direction in which a feeding opening points may be understood as a direction which points outside the volume enclosed by the outer shape of the nozzle head and which is normal to at least one cross section of the feeding opening.

In some embodiments, it might be provided that the nozzle head is configured so that a first ratio of the amount of fluid released by the pressure balancing opening to the amount of fluid released by the cleaning opening (mass/mass) is 0.2 or more, such as 0.5 or more, 0.9 or more, 1 or more, or 1.5 or more, and/or is 20 or less, such as 10 or less, 5 or less, 1 or less, 0.9 or less, or 0.5 or less, especially when the nozzle head is fed with a fluid through the feeding opening with 1 to 10 bar absolute, such as 2 to 6 bar absolute, or 3 bar absolute; and/or that the second direction vector is parallel to the center axis, the first direction vector is neither parallel nor anti-parallel to the center axis and/or an angle between a line defined by the first direction vector and a plane perpendicular to the center axis is between 10 degrees and 89 degrees, such as between 20 degrees and 80 degrees, between 30 degrees and 80 degrees, or between 40 and 80 degrees.

An appropriate first ratio allows obtaining pressure conditions which lead to a particularly good cleaning result. It turned out that at both ends of a glass element, such as a tubular element, a negative pressure can particularly be avoided for the proposed values of the first ratio. The ratio may take values larger than one or smaller than one.

In some embodiments, the nozzle head is configured such that in both half spaces within the tubular element an overpressure with respect to the environment outside the tubular element is present.

An exemplary first ratio allows obtaining a particularly efficient operational mode of the nozzle head and a good cleaning result.

In some embodiments, the first ratio is 1 or more, such as 1 to 5, 1 to 2, 1.0 to 1.5, or 1.00 to 1.3. If the ratio is 1 or more, such as more than 1.00, the cleaning of both end sections of a glass element can be improved.

This configuration is particularly useful, for example, if a tubular element is subject to a cleaning process. Then, in case that the part of both half spaces within the tubular element have a pressure with respect to the environment of the tubular element, a cleaning process can be conducted in an easy and efficient manner. Furthermore, a first ratio of 1 or more may prevent the creation of a negative pressure within the glass element and the suction of particles.

In some embodiments, the first ratio is less than 1. For example, the first ratio may be between 0.1 and 0.99, between 0.2 and 0.9, or between 0.2 and 0.8.

If the orientations of the cleaning and pressure balancing opening are chosen appropriately, the fluid flow can effectively interact with the particles. For example, it has been proven to be beneficial that the pressure balancing opening emits the fluid flow parallel to the center axis and the cleaning opening emit the fluid flow in a direction enclosing some angle with the center axis in the opposite direction.

In some embodiments, for each cleaning opening, the angles between the respective line defined by the respective first direction vector and the plane perpendicular to the center axis fulfill the stated condition.

In some embodiments, it might be provided that the nozzle head comprises a plurality of cleaning openings, such as between 2 and 50 cleaning openings, between 2 and 30 cleaning openings, between 2 and 12 cleaning openings, or 2, 4, 6, 8, 10 or 12 cleaning openings, each cleaning opening pointing in a first direction having a respective first direction vector.

The plurality of cleaning openings allows to distribute the fluid equally around the nozzle head. Thus, a more precise and efficient cleaning of glass elements is possible.

In some embodiments, at least some of the cleaning openings are arranged along at least one section of at least one circle extending around the outer circumference of the nozzle head, especially the circle is concentrically with the center axis of the nozzle head.

The nozzle head may comprise 6 cleaning openings.

It is acknowledged that every cleaning opening might point in a different first direction and typically will do so. Hence, there might be several first directions and the number of first directions equals the number of cleaning openings. However, in case that two or more of a plurality of cleaning openings point in a common first direction, the number of different first directions can also be less than the number of cleaning openings.

In some embodiments, it might be provided that the nozzle head comprises one single feeding opening and/or comprises a plurality of feeding openings, such as 2 to 10, 2 to 3, most or 2 feeding openings; that the nozzle head comprises one single pressure balancing opening and/or comprises a plurality of pressure balancing openings, such as 2 to 10, 2 to 3, or 2 pressure balancing openings; and/or that the nozzle head comprises one single feeding opening and one single pressure balancing opening and the only one feeding opening is arranged opposite to the only one pressure balancing opening along the center axis.

A single pressure balancing opening allows providing a nozzle head which is robust and easy to use.

A single feeding opening allows providing a nozzle head which is robust and easy to use.

If the nozzle head comprises one single pressure balancing opening and one single feeding opening, an efficient nozzle head can be provided. If the openings are arranged opposite along the center axis, the nozzle head has improved symmetry which reduces instabilities and possible oscillations during use.

In some embodiments, it might be provided that at least some or all of the one or more cleaning openings is/are arranged within the plane, such as perpendicular to a line defined by the third direction vector, and/or arranged such that they are crossed by the plane, such as perpendicular to a line defined by the third direction vector.

A particularly symmetric design of the nozzle is obtained if all or at least some of the cleaning openings determine at least in part the position and/or orientation of the plane. This in turn allows that the nozzle head produces a fluid output of high symmetry, hence, having high cleaning capabilities.

In some embodiments, it might be provided that at least one of the cleaning openings, such as all of them, is/are slit-shaped, such as 360 degrees slit-shaped, or round-shaped.

A round-shaped cleaning opening is easy to fabricate and produces an exemplary fluid stream. A slit-shaped cleaning opening is suitable to obtain a uniform fluid stream over a particularly larger or bended output section.

In some embodiments, it might be provided that at least one of the pressure balancing openings, at least one of the cleaning openings and/or at least one of the feeding openings, such as all of the respective openings, is/are arranged concentrically with regard to the center axis.

For example, the cleaning opening might be a 360-degrees slit opening which can be particularly easily provided in that it is arranged concentrically with regard to the center axis.

If the feeding opening(s) and/or the pressure balancing opening(s) are concentrically arranged, the handling of the nozzle head is more secure and convenient.

In some embodiments, it might be provided that a second ratio of the area of the cross section(s) of the pressure balancing opening(s) to the area of the cross section(s) of the cleaning opening(s) ($mm^2/mm^2$) is 0.2 or more, such as 0.5 or more, 0.9 or more, 1.0 or more, or 1.50 or more; and/or that the second ratio is 20 or less, such as 10 or less, 5 or less, 1 or less, 0.9 or less, or 0.5 or less.

An exemplary second ratio allows obtaining a particularly efficient operational mode of the nozzle head and a good cleaning result.

In some embodiments, it might be provided that the nozzle head comprises carbon fibers, a metal, a metal alloy or a polymer; for example, the nozzle head may comprise aluminum, steel, brass, polytetrafluorethylene or polyoxymethylene.

If a plastic material is chosen for the nozzle head, a quite robust nozzle head might be obtained. In addition, the risk that the nozzle head damages the glass element during operation can be further reduced in that.

For example, the nozzle head can be fabricated using injection molding.

In some embodiments, it might be provided that the maximum outer diameter of the nozzle head is 50 mm or less, such as between 1 mm and 50 mm, between 2 mm and 25 mm, or between 3 mm and 18 mm.

An exemplary outer diameter allows better cleaning of glass elements.

In some embodiments, it might be provided that the nozzle head comprises at least one supply channel or supply channel network for supplying the fluid from the feeding opening to the pressure balancing opening(s) and/or the cleaning opening(s), wherein the supply channel may comprise a cylindrical portion, such as a cylindrical portion having a diameter of 1.5 mm or more and/or of 25.0 mm or less.

A supply channel allows proper and efficient distribution of the fluid within the nozzle head. A supply channel of appropriate diameter allows matching operational requirements such as maximum allowable pressure applied to the nozzle head. Thus, safety is increased.

In some embodiments, it might be provided that all pressure balancing opening(s) and cleaning opening(s) are in fluidal communication with each other via the supply channel or the supply channel network.

The nozzle head can be particularly easily and cheaply manufactured if the respective openings are in fluidal communication with each other via the supply channel. Essentially, it is possible that the openings are just drilled into the nozzle head until they are connected with the supply channel or supply channel network which might have previously been provided within the nozzle head.

In some embodiments, it might be provided that the nozzle head further comprises at least one adjustment element for adjusting a third ratio, wherein the third ratio is the ratio of the amount of fluid released by one or more, such as all, of the cleaning openings, to the amount of fluid released by one or more, such as all, of the pressure balancing openings (mass/mass). In some embodiments: (i) the third ratio is adjusted by the adjustment element in that at least one cross section of each of the cleaning opening(s) and/or of the pressure balancing opening(s) is adjusted, especially increased or decreased; (ii) the adjustment element comprises at least one dosage ring and/or at least one part, especially an end section, of a fluid supply line; (iii) the adjustment element is arranged at least in part within the nozzle head; (iv) the adjustment element is moveable within the nozzle head, especially along an adjustment direction parallel to the center axis; (v) the third ratio is or can be adjusted by moving the adjustment element, especially along the adjustment direction; (vi) the third ratio is measured for a fluid pressure of 1 to 10 bar absolute, such as 2 to 6 bar absolute or 3 bar absolute; and/or (vii) the nozzle head further comprises a fixing element, such as a locking nut, for fixing the adjustment element at a particular position, especially for preventing a movement along the adjustment direction.

The adjustment element allows utilizing the nozzle head under different conditions. Dependent on the particular scenario, different fluid volumes can be easily chosen. Providing the adjustment element is also possible in an easy manner.

If the adjustment element comprises a dosage ring, the third ratio can be chosen very precisely. If the adjustment element comprises a part of the fluid supply line, a very compact setup is obtained.

If the adjustment element is arranged within the nozzle head, a compact setup is obtained. Furthermore, the adjustment element is securely provided.

Adjusting the third ratio is possible in a particularly easy and precise manner if the adjustment element is moveable.

A fixing element can be provided in an easy manner while the entire nozzle head still remains of compact design.

In some embodiments, it might be provided that the nozzle head comprises a first threaded portion, the first threaded portion may be at least in part comprised by at least one section of the feeding opening, and the adjustment element may comprise a second threaded portion, which may cooperate with the first threaded portion of the feeding opening, especially the cooperation allows moving the adjustment element along the adjustment direction.

A threaded portion allows securely attaching other elements to the nozzle head. If the threaded portion is provided at the feeding opening, respective feeding lines can be arranged in a safe manner.

If the adjustment element has a threaded portion, it is possible that the movement of the adjustment element within the nozzle head is mediated by the cooperation of the threaded portions. If the first threaded portion is comprised by at least one section of the feeding opening, the adjustment element might be moveable at least in part within the feeding opening.

In some embodiments, it might be provided that the nozzle head is configured so that the cleaning opening(s) and/or the pressure balancing opening(s) rotate around the center axis when fluid is released by the cleaning opening(s) and/or the pressure balancing opening(s), wherein the rotation is driven by the fluid jet released by the cleaning opening(s) and/or the pressure balancing opening(s).

The cleaning results obtained with the nozzle head are of particularly high quality if the nozzle head rotates.

In some embodiments, it might be provided that the cleaning opening(s) and/or the pressure balancing opening (s) are configured such that a line, such as all lines, defined by the first and/or second direction vector(s) do(es) not cross a line defined by the third direction vector; and/or that the cleaning opening(s) and/or the pressure balancing opening (s) are configured such that the fluid is helically released by the respective opening(s).

In some embodiments, it might be provided that the nozzle head is configured such that, when it is inserted into a glass element, especially a tubular glass element, e.g. a tubular glass element having an inner diameter of 0.5 cm to 10 cm, such as of 2 cm, a cylindrical portion of 2 cm to 200 cm and/or a length of 10 cm to 200 cm, such as of 100 cm, comprising a first end section and a second end section, in the first and the second end sections an excess pressure with regard to the ambient pressure exists, when at least one part of the fluid is released by the cleaning opening and at least one part of the fluid is released by the pressure balancing.

In some exemplary embodiments provided according to the invention, a cleaning system for cleaning the inside of a glass element with a fluid includes: a nozzle head as described herein; and a fluid supply line, which is connected to the feeding opening of the nozzle head.

It is the astonishing finding that the nozzle head can be used in combination with a fluid supply line connected to the nozzle head, so that a respective cleaning system takes all advantages described above with respect to the nozzle head as well.

In some embodiments, it might be provided that (i) the nozzle head is arranged at one end of the fluid supply line; (ii) the nozzle head is designed integrally with the fluid supply line; (iii) the adjustment element is provided by the fluid supply line; (iv) the adjustment element is designed integrally with the fluid supply line; (v) the supply line has a tubular shape, for example comprises a tube; and/or (vi) the fluid supply line or the nozzle head and the fluid supply line has a length of 5 cm to 100 cm, such as 10 cm to 75 cm or 20 cm to 50 cm.

An integral design of the nozzle head and the fluid supply line provides a particularly robust cleaning system and a reduced number of pieces.

An integral design of the adjustment element and the fluid supply line provides a particularly robust cleaning system and a reduced number of pieces.

A tubular shape may be provided for glass elements of hollow cylindrical shape.

In some embodiments, it might be provided that (i) the cleaning system is configured such that the nozzle head and/or the fluid supply line can be moved back and forth, especially along the center axis of the nozzle head and/or parallel or anti-parallel to the second and/or third direction; (ii) the cleaning system is configured such that the nozzle head, and in some embodiments also at least a part of the fluid supply line, is inside the glass element when the fluid is released by the nozzle head; (iii) the cleaning system is configured to clean the glass element from particles by releasing a fluid by the nozzle head while the nozzle head is located inside the glass element; and/or (iv) the cleaning system is configured to clean the glass element from particles in that the nozzle head and/or the fluid supply line is moved along a direction parallel to the second and/or third direction, such as inside the glass element, while the nozzle head does not release fluid and the nozzle head and/or the fluid supply line is moved along a direction parallel to the second and/or third direction, such as out of the glass element, while the nozzle head releases fluid.

The movement of the nozzle head and/or the fluid supply line allows that the nozzle head can be moved into the glass element, such as a glass tube, in an easy and efficient manner.

If the nozzle head and possibly also the fluid supply line is inside the glass element when the fluid is released by the nozzle head, it can be ensured that particles which are attached at an end section are not blown further into the glass element. Instead they are blown out of the glass element via the near end section.

Hence, if the fluid is released by the nozzle head while the nozzle head is located inside the glass element, the particles can be purposefully blown directly towards the closer end of the glass element. In addition, the direct interaction between the fluid released by the cleaning opening and the particles is increased. All this improves the quality of the cleaning process.

If the nozzle head is moved into the glass element prior to releasing fluid from the nozzle head and is moved back outside the glass element while releasing fluid from the nozzle head, the particles are efficiently removed from the glass element because they are moved so to say from inside to outside.

Since the cleaning opening(s) are close to the inner surface of the glass element, much higher and constant flow velocities are obtained compared to a laminar flow. It is also noted that the amount of fluid can be reduced significantly with the approach disclosed herein due to direction interaction of the fluid with the particles. This also reduces noise emissions.

In some embodiments, it might be provided that (i) the cleaning system further comprises at least one fixation unit, such as a conveyor belt or a roll, for holding the glass element during cleaning in a fixed position; (ii) the cleaning system further comprises at least one fluid supply element, such as a tank, a recycling facility or a fluid filter system, for supplying fluid to the nozzle head via the fluid supply line, the fluid supply element supplying a fluid, such as a gas, especially a noble gas, such as helium (He), neon (Ne) or argon (Ar), nitrogen, oxygen, carbon dioxide or air, a liquid, water vapor, or a mixture thereof; and/or (iii) the water content in the fluid supplied to the nozzle head is 10 mass-% or less; such as 1 mass-% or less, 0.1 mass-% or less, or 0.01 mass-% or less.

A fixation unit allows providing a secure cleaning process. For example, rolls can be used which apply pressure on the glass element, e.g. from above. This prevents that the glass element, such as a pipe, is blown away during the cleaning process.

A fluid supply element allows ensuring a reliable supply of fluid to the cleaning system.

A reduced water content allows performing the cleaning process more efficiently.

In some embodiments, it might be provided that the cleaning system is configured to rotated either the glass element and/or the nozzle head while the fluid is released by the nozzle head.

The relative rotation allows performing a particularly efficient cleaning process. This is because the area of direct interaction between the fluid and the surface of the glass element is increased.

In some embodiments, it might be provided that the cleaning system comprises a vibrator unit configured to shake the glass element at least from time to time during the cleaning process, especially with a frequency of 100 to 10000 Hz, such as 200 to 5000 Hz or 250 to 4000 Hz and/or an amplitude of 0.1 mm to 10 mm, such as 0.5 mm to 1 mm or 0.7 mm to 0.9 mm.

The vibration unit allows performing a particularly efficient cleaning process in that the glass element is shaken. This allows supporting movement of particles in combination with the fluid.

For example, shaking may mean that pulse-like vibrations are applied. This provides an effective way of cleaning.

In some embodiments, it might be provided that (i) the cleaning system is configured to release at least one fluid stream through one of the cleaning and pressure balancing openings, such as all fluid streams through all cleaning and pressure balancing openings, with a flow-rate of between 5 and 100 m 3 per hour; (ii) the ratio of the maximum outer diameter of the nozzle head to the inner diameter of the glass element is between 0.5 and 0.9; (iii) the ratio of the outer diameter of the fluid supply line, especially of the threaded portion, to the inner diameter of the glass element is between 0.2 and 0.9; and/or (iv) the cleaning system is configured to release the fluid in a continuous manner and/or in a pulsed manner through one or more, such as all, cleaning and pressure balancing openings.

An exemplary flow-rate allows providing an efficient cleaning process.

If the difference between the outer diameter of the nozzle head and the inner diameter of the glass element is chosen appropriately, the fluid can interact with the particles attached to the glass element, such as a glass tube, in an exemplary manner.

A fluid provision in a pulsed manner improves interaction between the fluid flow and the glass element. A fluid provision in a continuous manner allows an easy implementation of the cleaning system.

In some embodiments, it might be provided that the cleaning system comprises a glass element, especially a tubular glass element, e.g. a tubular glass element having an inner diameter of 0.5 cm to 10 cm, such as of 2 cm, a cylindrical portion of 2 cm to 200 cm, and/or a length of 10 cm to 200 cm, such as of 100 cm, comprising a first end section and a second end section, the nozzle head being configured that in the first and the second end sections an excess pressure with regard to the ambient pressure exists, when at least one part of the fluid is released by the cleaning opening and at least one part of the fluid is released by pressure balancing opening.

In some exemplary embodiments provided according to the invention, a method for cleaning a glass element, which may use the previously described nozzle head provided according to the invention or any embodiment described herein or by the previously described cleaning system provided according to the invention or any embodiment described herein, the method comprising the steps of:

- providing a glass element;
- inserting a nozzle head inside the glass element along a specific direction, which may be parallel to the second and/or third direction, while the nozzle head does not release fluid; and
- releasing fluid out of the nozzle head, such as while moving the nozzle head, especially within the glass element, along a direction which is opposite to the specific direction.

Exemplary embodiments provided according to the invention are, thus, based on the finding that particles are efficiently removed from the glass element if they are blown from inside to outside. This can be realized in an efficient manner in that the nozzle head is inserted inside the glass element while the nozzle head does not release fluid and the nozzle head is moved inside the glass element while releasing fluid from the nozzle head.

In some embodiments, it might be provided that fluid is released out of the nozzle head, while moving the nozzle head within the glass element in the third direction until the nozzle head has left the glass element.

In some embodiments, it might be provided that the steps of inserting and releasing are performed in 1 minute or less, such as 30 seconds or less, 15 seconds or less, 10 seconds or less, or 5 seconds or less.

In some exemplary embodiments provided according to the invention, a glass element includes a first end, a second end and a hollow portion, the hollow portion including: i) a first end section comprising the first end of the glass element, ii) a middle section, and iii) a second end section comprising the second end of the glass element, each section having an inner and an outer surface and all sections are of equal length, the ratio of the number of particles on the inner surface at the first and/or the second end section to the number of particles on the inner surface at the middle section is 20 or less.

Exemplary embodiments provided according to the invention are, thus, based on the surprising finding that a glass element is particularly suited for holding sensitive substances such as pharmaceutical compositions if the surface enlargement of the glass element is limited. It turned out that a low surface enlargement prevents or at least reduces the diffusion of substances contained in the glass material to a composition hold by the glass element.

It has been astonishing that controlling the ratio of the number of particles allows producing a high quality glass element which is particularly suitable for holding pharmaceutical compositions. The approach disclosed herein makes it quite easy to produce a respective glass element of high quality.

Determining the relevant particles may be conducted according to the following method:

In a dark room, the glass element to be examined is illuminated, e.g. with 5000 lux. The particles are identified by the diffraction, reflection or absorption of the light. A hand microscope, for example a hand microscope "Wide Stand Microscope" from PEAK, can be used to identify the particles. The particles optically identified in this way are visibly marked. The glass element marked in this way is viewed along the normal to the surface under a light microscope, for example the Axio Imager M2m from Zeiss, with lens LD EC Epiplan 50×/0.55 HD DIC and ocular PI 10×/2, to characterize and measure the length of the particles. Herein, the size of the particles relates to the largest extension visible in the viewing plane (Feret diameter). With this type of measurement, it is consciously accepted that the maximum longitudinal extent of a three-dimensional particle can also extent in the direction of the optical axis of the microscope, i.e. along the normal. In this case, a smaller value for the size of the particle is obtained than the actual value of the maximum longitudinal extent of the three-dimensional particle, for example the glass particle. It is acknowledged that with this method, at least particles having a size of 50 μm or more, i.e. the largest extension visible in the viewing plane, can be characterized with regard to their size and kind, e.g. glass, metal, dust or salt. Optional, particles having a size of less than 50 μm may not be considered as particles according to the invention described herein in light of this method.

If not stated otherwise, in the context of the present application, a glass element may comprise a first end, a second end and/or a hollow portion, such as a cylindrical hollow portion, wherein the hollow portion may comprise a first end section comprising the first end of the glass element, a middle section, and/or a second end section comprising the second end of the glass element. Each section may have an inner and/or an outer surface. Each of all sections may be of equal length.

In some embodiments, it might be provided that the ratio of the number of particles on the inner surface at the first and/or the second end section to the number of particles on the inner surface at the middle section is 15 or less, such as 10 or less, 8 or less, 6 or less, 4 or less, 2 or less, and/or 1.0 or more.

A glass element of particularly high quality can be obtained for respective ratios.

In some embodiments, it might be provided that the number of particles on the inner surface at the first and/or the second end section is 0 or more, such as 50 or more, 100 or more, and/or 1000 or less, such as 900 or less, 800 or less, 700 or less, 600 or less, 500 or less, 400 or less, 300 or less, or 200 or less.

It has been found that the quality and safety of the glass element is improved if the number of particles is restricted. This allows obtaining a smooth surface.

In some embodiments, it might be provided that the number of particles on the inner surface at the middle section is 0 or more, such as 50 or more, 100 or more, and/or 1000 or less, such as 900 or less, 800 or less, 700 or less, 600 or less, 500 or less, 400 or less, 300 or less, or 200 or less.

It has been found that the quality and safety of the glass element is improved if the number of particles is restricted. This allows obtaining a smooth surface.

In some embodiments, it might be provided that the number of particles on the inner surface at the first and/or the second end section per cm2 is in average 10 or less, such as 9 or less, 8 or less, 7 or less, 6 or less, 5 or less, 4 or less, 3 or less, 2 or less, or 1 or less, and/or the number of particles on the outer surface at the first and/or the second end section per mm2 is 10 or less, such as 9 or less, 8 or less, 7 or less, 6 or less, 5 or less, 4 or less, 3 or less, 2 or less, or 1 or less.

It has been found that the quality and safety of the glass element is improved if the density of particles is restricted. This allows obtaining a smooth surface.

In some embodiments, it might be provided that (i) the particle size, such as its largest extension, is 50 μm or more, such as 60 μm or more, 70 μm or more, 80 μm or more, 90 μm or more, 100 μm or more, 110 μm or more, 120 μm or more, 130 μm or more, 140 μm or more, or 150 μm or more; and/or (ii) the particle size, such as its largest extension, is 1000 μm or less, such as 900 μm or less, 800 μm or less, 700 μm or less, 600 μm or less, 500 μm or less, 400 μm or less, 300 μm or less, 200 μm or less, or 150 μm or less.

It is the astonishing finding that only particles of respective extension are relevant for assessing the quality of the glass element. It is, therefore, sufficient to address particularly these particles while others may remain unaffected. This reduces costs for providing high quality glass elements.

It may be understood by the person skilled in the art that particles having a size outside of the stated range can nevertheless be present on the inner and/or outer surface, however, these particles are not taken into consideration for the ratio. For example, if the particle size were 50 μm or more, then there can be no or very many particles present on the inner and/or outer surface having a size of 2 μm, but they would not be relevant for the ratio.

In some embodiments, it might be provided that the glass element does not contain any particles on the inner surface at the first and/or the second end section having a particle size, such as having a largest extension, of 1000 μm or more, such as 900 μm or more, 800 μm or more, 700 μm or more, 600 μm or more, 500 μm or more, 400 μm or more, 300 μm or more, 200 μm or more, 150 μm or more, 100 μm or more, or 50 μm or more.

If particles are restricted in their size, it is easily possible to provide high quality glass elements.

In some embodiments, it might be provided that the ratio of the number of particles on the inner surface of the first end section, the middle section, the second end section and/or any combination thereof, to the number of particles on the outer surface of the respective section(s), is between 0.5 and 1.5, such as between 0.9 and 1.1.

It turned out that a particularly improved glass element is obtained if inner and outer surface are similar with respect to their roughness. This finding has its basis in the fact that a similar roughness surprisingly improves strength of the glass element.

In some embodiments, it might be provided that the particles are inorganic particles and/or are selected from glass, metal, dust, salt.

It may be understood by the person skilled in the art that particles of other materials than these stated can nevertheless be present on the inner and/or outer surface, however, these particles are not taken into consideration for the ratio. For example, if the particles were glass, then there can be no or very many salt particles present on the inner and/or outer surface, but they would not be relevant for the ratio.

In some embodiments, it might be provided that the length of the hollow portion is 2 cm or more, such as 10 cm or more, 20 cm or more, 30 cm or more, 40 cm or more, 50 cm or more, 110 cm or more, and/or 500 cm or less, such as 400 cm or less, 300 cm or less, 200 cm or less, 100 cm or less, or 50 cm or less.

A glass element of respective length allows to easily produce a surface with improved quality.

In some embodiments, it might be provided that the outer diameter of the hollow portion is 3 mm or more, such as 4 mm or more, 5 mm or more, 6 mm or more, 7 mm or more, 8 mm or more, 9 mm or more, 10 mm or more, 15 mm or more, 20 mm or more, and/or 20 cm or less, such as 15 cm or less, 10 cm or less, 5 cm or less, 4 cm or less, 3 cm or less, or 2 cm or less.

A glass element having a respective diameter may be manufactured in an easy manner.

In some embodiments, it might be provided that (i) the hollow portion is at least in part designed as hollow cylindrical portion; (ii) the glass element is a glass tube; and/or (iii) the glass element comprises, such as is made of, a borosilicate glass, a soda lime glass or aluminosilicate glass.

If the glass element is of a respective glass material, it can be used in a plurality of scenarios.

A glass tube of high quality is of particular interest.

In some embodiments, it might be provided that the first end of the glass element is an open end, especially the lumen of the glass element being in fluidal communication with the environment of the glass element via the first end of the glass element, and/or the second end of the glass element is an open end, especially the lumen of the glass element being in fluidal communication with the environment of the glass element via the second end of the glass element.

A glass element having one or more open ends allows to access the lumen easily.

In some embodiments, it might be provided that the first end of the glass element is a closed end and/or the second end of the glass element is a closed end.

A glass element having one or more closed end allows reducing or even preventing further contaminations.

In some embodiments, it might be provided that the glass element is or can be produced by a Danner process and/or a Vello process. This allows for a cheap and efficient manufacturing process.

In some embodiments, it might be provided that the glass element has been cut to length from a longer, especially continuous, glass tube strand, such as by scratching and/or breaking.

It is cheap and easy to produce a glass tube strand and confectioning this into smaller pieces in order to obtain a glass element of appropriate length.

In some embodiments, it might be provided that the glass element has been cleaned by at least one air stream applied at least in part to its inner and/or outer surface such that at least some of the particles located on the respective surface (s) are blown away from the surface and/or out of the lumen, and/or the air stream is moved relative to the glass element from the middle section to the first or second end of the glass element.

A glass element is of particularly high quality if it has been cleaned appropriately.

In some embodiments, it might be provided that the glass element has been shaken during the cleaning process, especially with a frequency of 100 to 10000 Hz, such as 200 to 5000 Hz or 250 to 4000 Hz and/or an amplitude of 0.1 mm to 10 mm, such as 0.5 mm to 1 mm or 0.7 mm to 0.9 mm.

Mechanical shaking of the glass element allows producing a glass element which is particularly free of particles which otherwise might come off on their own from the surface such as the inner or outer surface of the glass element at some later time. Thus, safety is improved.

In some embodiments, it might be provided that the glass element is cleaned before it is reheated and/or after it has been cut from a longer, especially continuous, glass tube strand, such as by scratching and/or breaking.

This allows ensuring that loose particles are removed so that they are not heated and subsequently attach permanently at the surface. Hence, quality of the glass element is improved.

A glass element, such as the previously described glass element or any embodiments described herein, which has been cleaned by and/or is obtainable by a method provided according to the invention or any embodiment described herein, by a nozzle head provided according to the invention or any embodiment described herein and/or by a cleaning system provided according to the invention or any embodiment described herein is also provided.

In some exemplary embodiments provided according to the invention, a bundle of glass elements, comprising a plurality, such as between 2 and 500 or 50 to 200, of glass elements provided according to the invention or any embodiment described herein is provided.

Having a bundle of high quality glass elements allows ensuring quality over a large number of different glass elements which otherwise is not possible.

Herein, a bundle may be a trading, loading or packaging unit for distribution of glass elements, such as empty pharmaceutical cylindrical containers, i.e. pharmaceutical cylindrical containers filled with a gas, e.g. air. For example, products usually, but not necessarily, of the same kind are combined as bundles when ordered together in retail or bundled in logistics. According to the invention, glass elements in the bundle can be separated by a spacer, for example a plastic or paper sheet, so that they are not in direct contact with each other during transport. Usually, but not necessarily, the bundle is at least partly covered by a plastic foil. In some embodiments, one bundle contains 5 to 5000, such as 10 to 1000, 25 to 500, 50 to 300, or 75 to 250 glass elements. An example of a bundle is the DENSOPACK® from SCHOTT AG. Due to economic reasons, the bundle may contain 25 to 500, such as 50 to 300 or 75 to 250 glass elements, which are at least partly covered by a plastic foil and wherein the glass elements are in direct contact to each other within the bundle. In some embodiments, the length of the hollow portion, such as the hollow cylindrical portion of the glass elements in the bundle is 2 cm or more, such as 10 cm or more, 20 cm or more, 30 cm or more, 40 cm or more, 50 cm or more, or 100 cm or more, and/or 500 cm or less, such as 400 cm or less, 300 cm or less, 200 cm or less, 100 cm or less, or 50 cm or less.

In some embodiments, it might be provided that the bundle is at least in part packed in a foil. A foil prevents the glass elements from further contaminations.

In some embodiments, it might be provided that at least some, such as all, of the plurality of glass elements are kept within the bundle at a distance from each other by at least one, such as a plurality of, spacing element(s).

A spacing element prevents the glass elements from damage. This makes it possible to handle the bundle in a safe manner.

In some embodiments, it might be provided that at least some, such as all, of the plurality of glass elements are in direct contact with each other.

A direct contact allows to reduce vibrations of the glass elements so that the bundle can be handled more secure.

Referring now to the drawings, FIG. 1 shows a cross-sectional view of a nozzle head 1 provided according to the invention in a first configuration.

The nozzle head 1 is suitable for cleaning the inside of a glass element with a fluid 3. The fluid 3 is indicated by arrows.

The nozzle head 1 comprises a plurality of cleaning openings 5 (two of which are shown in FIG. 1) for releasing at least one part of the fluid. Each of the cleaning openings 5 point in a first direction R1. Since each of the plurality of cleaning openings 5 point in an individual first direction, thus, there are just as many first directions as cleaning openings.

The nozzle head 1 comprises one pressure balancing opening 7 for releasing at least one part of the fluid 3 and pointing in a second direction R2. The pressure balancing opening 7 is arranged concentrically with regard to the center axis A of the nozzle head 1.

Two half spaces, a first one H1 and a second one H2, are separated by a plane P which is perpendicular to the center axis A.

Each of the first direction vectors of the first directions R1 point in a direction away from the second half space H2. The second direction vector of the second direction R2 points in a direction away from the first half space H1.

The nozzle head further comprises a feeding opening 9 for feeding the nozzle head 1 with the fluid 3. The feeding opening 9 is arranged concentrically with regard to the center axis A of the nozzle head 1. The feeding opening 9 points in a third direction R3. The third direction vector of the third direction R3 points in a direction away from the second half space H2 and the third direction vector is anti-parallel to the second direction R2.

To be more precise, the nozzle head 1 comprises one single feeding opening 9 and one single pressure balancing opening 7 and the only one feeding opening 9 is arranged opposite to the only one pressure balancing opening 7 along the center axis A.

The nozzle head 1 comprises a supply channel 11 for supplying the fluid 3 from the feeding opening 9 to the pressure balancing opening 7 and the cleaning openings 5. All pressure balancing and cleaning openings are in fluidal communication with each other via the supply channel 11.

The nozzle head 1 further comprises an adjustment element 13 for adjusting a third ratio of the fluid volume provided to all of the cleaning openings 5 and to the pressure balancing opening 7.

The adjustment element 13 comprises a dosage ring. The adjustment element 13 is arranged at least in part within the nozzle head 1. The adjustment element 13 is moveable within the nozzle head 1 along an adjustment direction parallel to the center axis A. Thus, the third ratio is or can be adjusted by moving the adjustment element 13 along the adjustment direction.

The nozzle head 1 further comprises a fixing element 15 for fixing the adjustment element 13 at a particular position, especially for preventing a movement along the adjustment direction. The fixing element 15 might be a locking nut.

The nozzle head 1 comprises a first threaded portion 17. The first threaded portion 17 is at least in part comprised by the feeding opening 9. The adjustment element 13 comprises a second threaded portion 19, which cooperates with the first threaded portion 17 of the feeding opening 9. The cooperation allows to move the adjustment element 15 along the adjustment direction. Of course, the fixing element 15 has to be released during moving.

Figure 2:
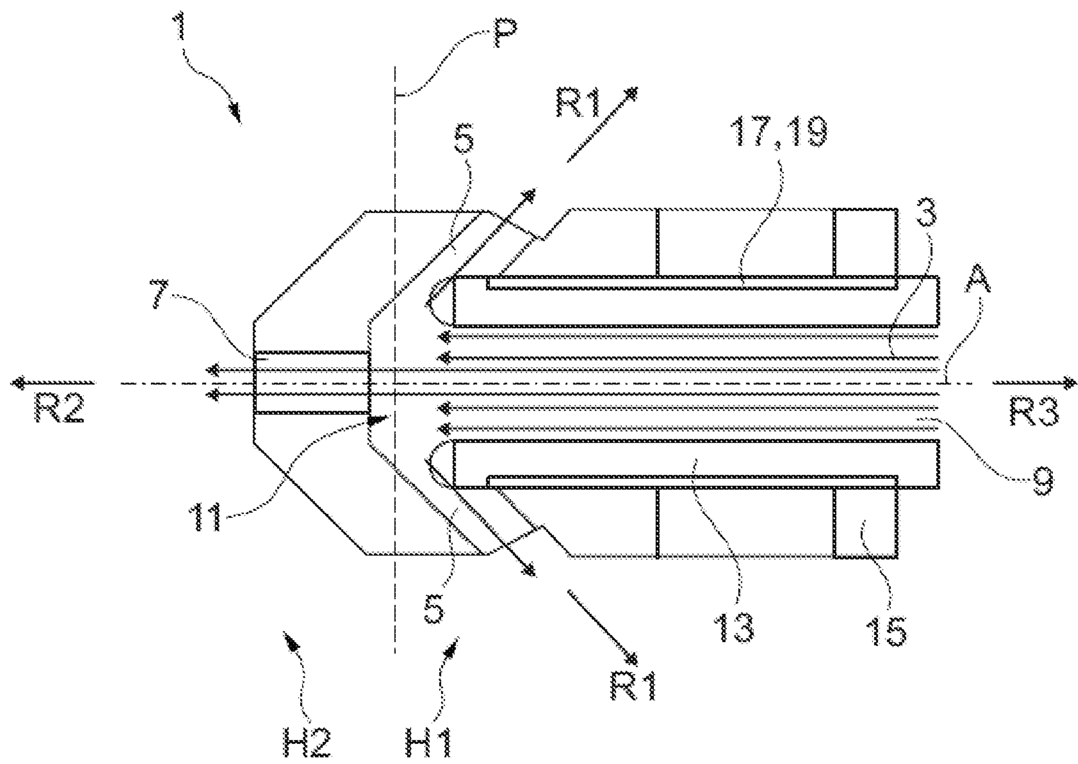
FIG. 2 illustrates a cross-sectional view of the nozzle head of FIG. 1 in a second configuration.

FIG. 2 shows a cross-sectional view of the nozzle head 1 in a second configuration.

In that second configuration, the third ratio has been adjusted by moving the adjustment element 13 along the adjustment direction, i.e to the left in FIGS. 1 and 2. As indicated in that there is only one arrow present in each of the cleaning openings 5 in FIG. 2 (compared to two in FIG. 1), less fluid 3 fed into the feeding opening 9 is released by the cleaning openings in the second configuration compared to the first configuration. The adjustment of the third ratio is accomplished in that basically the adjustment element 13 decreases a cross-section of each of the cleaning openings.

Figure 3:
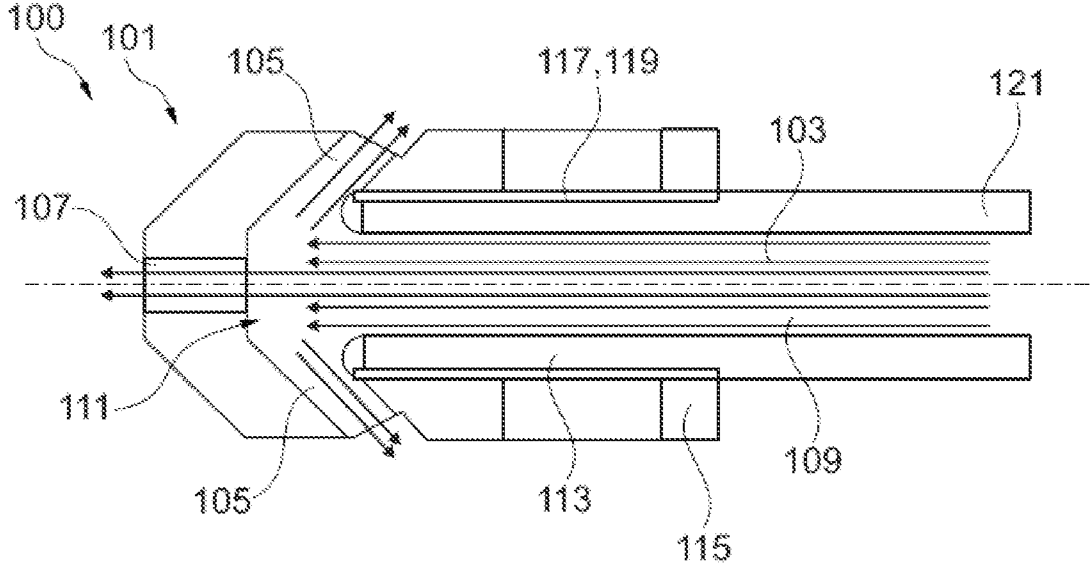
FIG. 3 illustrates a perspective view of an exemplary embodiment of a cleaning system provided according to the invention.

FIG. 3 shows a cross-sectional view of an exemplary embodiment of a cleaning system 100 provided according to the invention.

The cleaning system 100 comprises a nozzle head 101. The nozzle head 101 might be the nozzle head 1 described above with respect to FIGS. 1 and 2. Hence, for the same structural features of the nozzle head 101 the same reference numerals are used as for the nozzle head 1, however, increased by 100. Furthermore, for all aspects concerning the nozzle head 101, reference can be made to the description provided previously with respect to nozzle head 1 in combination with FIGS. 1 and 2.

The cleaning system 100 also comprises a fluid supply line 121, which is connected to the feeding opening 109 of the nozzle head 101. Indeed, the adjustment element 113 is designed integrally with the fluid supply line 121.

Figure 4A:
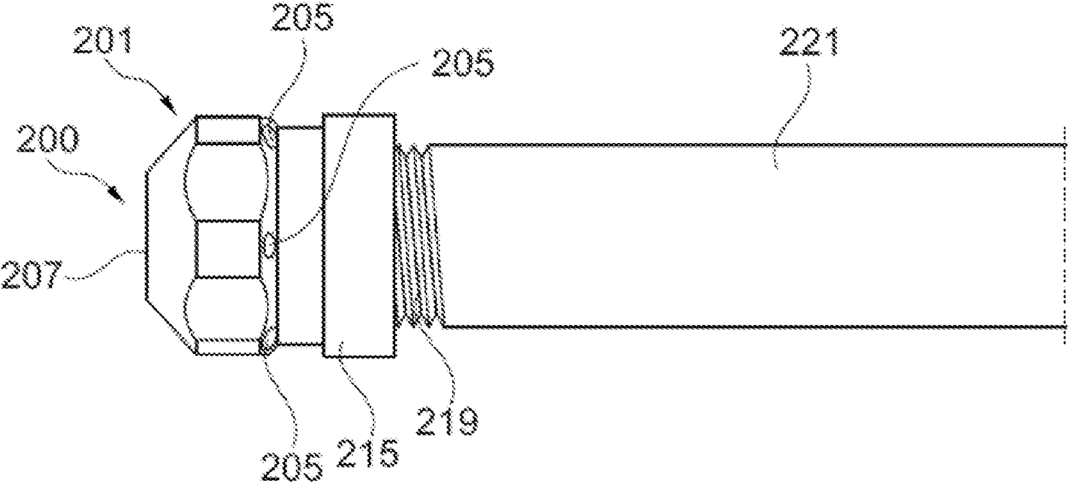
FIG. 4A illustrates a perspective view of another exemplary embodiment of a cleaning system provided according to the invention in an assembled state.
Figure 4B:
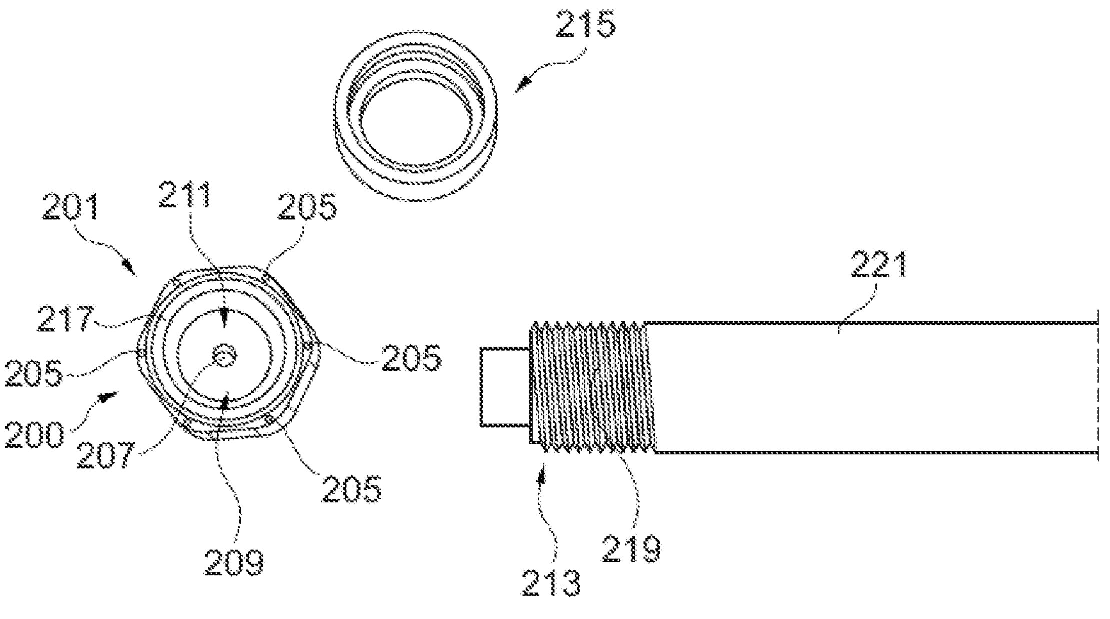
FIG. 4B illustrates a perspective view of the cleaning system of FIG. 4A in a disassembled state.

FIGS. 4A and 4B show a perspective view of another exemplary embodiment of a cleaning system 200 provided according to the invention, respectively, in an assembled and disassembled state.

Indeed, the cleaning system 200 is similar to the cleaning system 100 described previously with respect to FIG. 3. Hence, for the same structural features the same reference numerals are used, however, increased by 100.

In FIG. 4A the cleaning system 200 is shown in an assembled state. In FIG. 4B the cleaning system 200 is shown disassembled into parts. It is apparent from FIG. 4B that the adjustment element 113 and the fixing element 215 can be separated from the remaining nozzle head 201. The adjustment element is designed in one piece with the fluid supply line 221.

Figure 5:
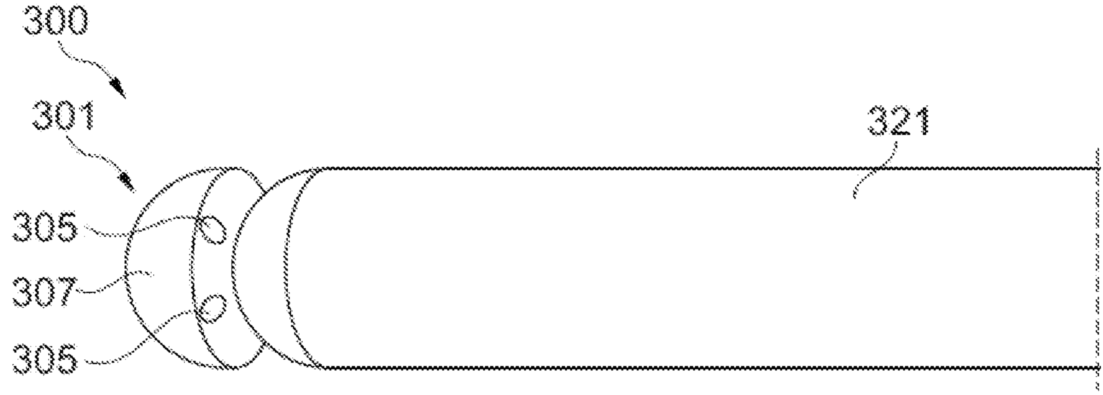
FIG. 5 illustrates a perspective view of another exemplary embodiment of a cleaning system provided according to the invention.

FIG. 5 shows a perspective view of another exemplary embodiment of a cleaning system 300 provided according to the invention.

Indeed, the cleaning system 300 is similar to the cleaning systems 100 and 200 described previously, respectively, with respect to FIG. 3 and FIGS. 4A and 4B. Hence, for the same structural features the same reference numerals are used, however, increased by 200 or 100. Furthermore, only the differences between the cleaning system 300 and the cleaning systems 100 and 200 need to be discussed here, while for the remainder reference can be made to the description provided previously with respect to the cleaning systems 100 and 200 in combination with FIG. 3 and FIGS. 4A and 4B.

In cleaning system 300, the nozzle head 301 is designed integrally with the fluid supply line 321. The nozzle head 301, therefore, does not need and does not have a fixing element. The nozzle head 301 has also no adjustment element. Consequently, there are also no first and second threaded portions required. Nozzle head 301, thus, cleaning system 300 is, therefore, particularly robust and cheap.

A nozzle head, such as the nozzle head 301 of cleaning system 300, might be produced by a 3D printing technology. This allows realizing also designs of nozzle heads which are hard to produce in a conventional manner.

Figure 6:
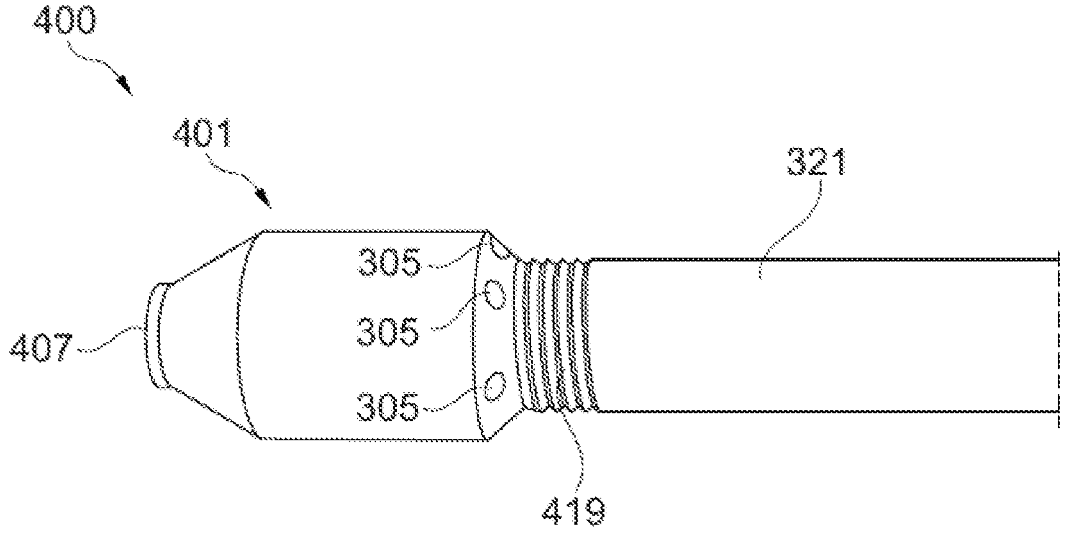
FIG. 6 illustrates a perspective view of another exemplary embodiment of a cleaning system provided according to the invention.

FIG. 6 shows a perspective view of another exemplary embodiment of a cleaning system 400 provided according to the invention.

Indeed, the cleaning system 400 is similar to the cleaning systems 100 and 200 described previously, respectively, with respect to FIG. 3 and FIGS. 4A and 4B. Hence, for the same structural features the same reference numerals are used, however, increased by 300 or 200. Furthermore, only the differences between the cleaning system 400 and the cleaning systems 100 and 200 need to be discussed here, while for the remainder reference can be made to the description provided above with respect to the cleaning systems 100 and 200 in combination with FIG. 3 and FIGS. 4A and 4B.

In cleaning system 400, the nozzle head 401 does not have a fixing element. This is also possible, for example, in situations where there is enough friction between the two threaded portions (only the second threaded portion 419 is visible in FIG. 6) so that the adjustment element is not moved unintentionally within the nozzle head.

Figure 7:
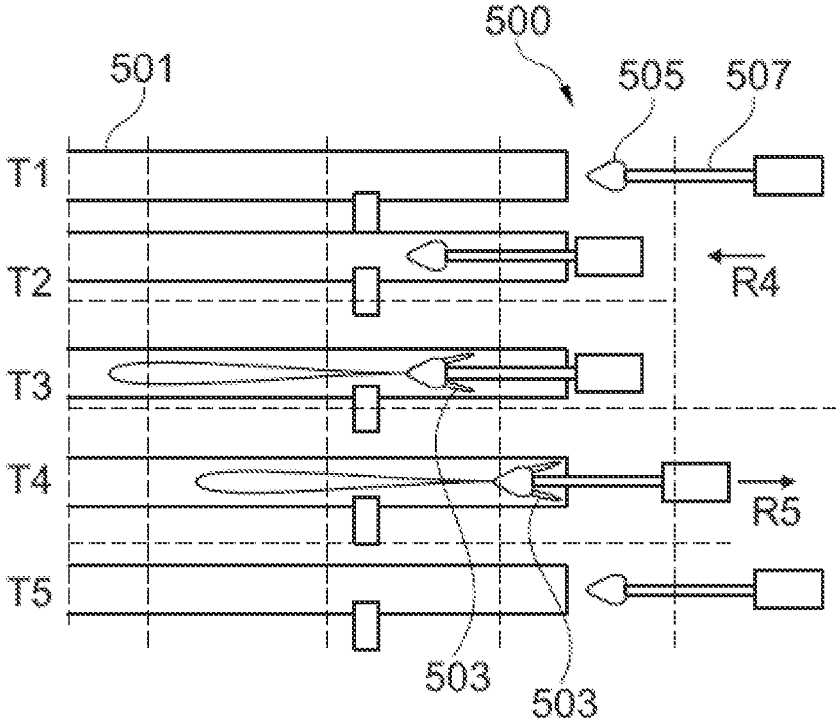
FIG. 7 shows an illustration demonstrating how a cleaning system provided according to the invention can be used for cleaning the inside of a glass element with a fluid.

FIG. 7 shows an illustration with multiple subsequent time steps T1-T5 demonstrating how a cleaning system 500 provided according to the invention can be used for cleaning the inside of a glass element 501 with a fluid 503.

For the purpose of illustration, the cleaning system 500 is shown only with its nozzle head 505 and supply line 507. The glass element 501 might be a glass tube.

The cleaning system 500 is configured to clean the glass element from particles in that the nozzle head 505 is moved along a fourth direction R4 inside the glass element 501 while the nozzle head 505 does not release fluid (see time steps T1 and T2) and the nozzle head 505 is moved in a fifth direction R5 out of the glass element 501 while the nozzle head 505 releases fluid (see time steps T3, T4 and T5). The fourth direction R4 is parallel to the second direction of the nozzle head. The fifth direction R5 is parallel to the third direction of the nozzle head.

Of course, any cleaning system provided according to the invention, such as any one of the cleaning systems 200, 300 and 400 described previously, might be configured accordingly.

Figure 8:
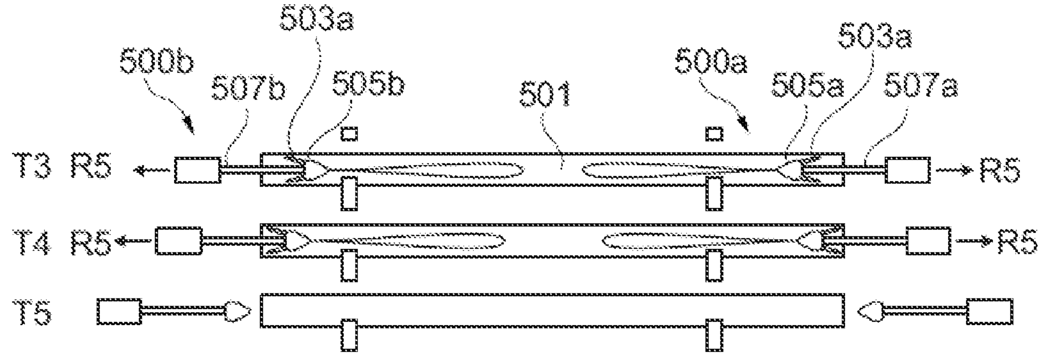
FIG. 8 shows an alternative to the illustration of FIG. 7.

FIG. 8 shows an alternative to the illustration of FIG. 7. Here, two cleaning systems 500*a*, 500*b* are used to clean the glass element 501 from two ends simultaneously. Only the last three time steps are shown. Of course, in order to clean the glass element 501 also in the center in a precise manner, it might be possible to advance the movement of one of the two systems 500*a*, 500*b* so that the nozzle heads 503*a*, 503*b* do not collide at the center of the glass element 501.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

LIST OF REFERENCE NUMERALS

1, 101, 201, 301, 401 Nozzle head
3, 103 Fluid
5, 105, 205, 305, 405 Opening
7, 107, 207, 307, 407 Opening
9, 109, 209 Opening
11, 111, 211 Supply channel
13, 113, 213 Adjustment Element
15, 115, 215 Fixing element
17, 117, 217 Threaded Portion
19, 119, 219, 419 Threaded Portion
121, 221, 321, 421 Fluid Supply line
100, 200, 300, 400, 500 Cleaning System
501 Glass element
503, 503*a*, 503*b* Fluid
505, 505*a*, 505*b* Nozzle head
507, 507*a*, 507*b* Fluid Supply line
A Axis
H1, H2 Half Space
P Plane
R1, R2, R3, R4, R5 Direction
T1, T2, T3, T4, T5 Time step

What is claimed is:

1. A cleaning system for cleaning the inside of a glass element with a fluid, the cleaning system comprising:
a nozzle head comprising:
a cleaning opening for releasing a part of the fluid and pointing in a first direction; and
a pressure balancing opening for releasing a part of the fluid and pointing in a second direction, wherein two half spaces comprising a first one and a second one are separated by a plane which is perpendicular to a center axis of the nozzle head, wherein a first direction vector of the first direction points in a direction at least one of towards the first half space or away from the second half space, wherein a second direction vector of the second direction points in a direction at least one of towards the second half space or away from the first half space, wherein the pressure balancing opening is arranged to extend concentrically with regard to the center axis of the nozzle head.

2. The cleaning system of claim 1, wherein the nozzle head comprises a feeding opening, the cleaning system further comprising a fluid supply line that is connected to the feeding opening of the nozzle head.

3. The cleaning system of claim 2, wherein the feeding opening points in a third direction and a third direction vector of the third direction points towards the first half space and/or away from the second half space.

4. The cleaning system of claim 2, wherein the feeding opening points in a third direction and a third direction vector of the third direction is anti-parallel to the second direction.

5. The cleaning system of claim 2, wherein the feeding opening points in a third direction and a third direction vector of the third direction is parallel to the center axis of the nozzle head.

6. The cleaning system of claim 1, wherein the center axis is a rotation axis of the nozzle head.

7. The cleaning system of claim 1, wherein the nozzle head is configured so that a first ratio of an amount of fluid released by the pressure balancing opening to an amount of fluid released by the cleaning opening is 0.2 or more and/or is 20 or less.

8. The cleaning system of claim 7, wherein the first ratio is 1 to 5.

9. The cleaning system of claim 1, wherein the nozzle head comprises at least one additional cleaning opening pointing in the first direction having a respective first direction vector.

10. The cleaning system of claim 9, wherein the cleaning opening and the at least one additional cleaning opening are arranged along at least one section of a circle extending around an outer circumference of the nozzle head.

11. The cleaning system of claim 10, wherein the circle is concentric with the center axis of the nozzle head.

12. The cleaning system of claim 1, wherein a second ratio of an area of a cross section of the pressure balancing opening to an area of a cross section of the cleaning opening is 0.2 or more and/or is 20 or less.

13. The cleaning system of claim 1, wherein the nozzle head comprises carbon fibers, a metal, a metal alloy, or a polymer.

14. The cleaning system of claim 1, wherein the nozzle head comprises an adjustment element configured to adjust a third ratio of an amount of fluid released by the cleaning opening to an amount of fluid released by the pressure balancing opening.

15. A method for cleaning a glass element with a nozzle head of a cleaning system, the method comprising:
inserting the nozzle head inside the glass element, the nozzle head comprising:
a cleaning opening for releasing a part of the fluid and pointing in a first direction; and
a pressure balancing opening for releasing a part of the fluid and pointing in a second direction, wherein two half spaces comprising a first one and a second one are separated by a plane which is perpendicular to a center axis of the nozzle head, wherein a first direction vector of the first direction points in a direction at least one of towards the first half space or away from the second half space, wherein a second direction vector of the second direction points in a direction at least one of towards the second half space or away from the first half space, wherein the pressure balancing opening is arranged to extend concentrically with regard to the center axis of the nozzle head; and releasing fluid out of the nozzle head within the glass element.

16. The method of claim 15, further comprising moving the nozzle head while releasing the fluid out of the nozzle head.

17. The method of claim 16, wherein the nozzle head is inserted inside the glass element while the nozzle head does not release fluid.

18. The method of claim 15, wherein the nozzle head comprises a feeding opening, the cleaning system further comprising a fluid supply line that is connected to the feeding opening of the nozzle head.

19. The method of claim 18, wherein the feeding opening points in a third direction and a third direction vector of the third direction points towards the first half space and/or away from the second half space.

20. The method of claim 18, wherein the feeding opening points in a third direction and a third direction vector of the third direction is anti-parallel to the second direction.

* * * * *